US012742357B2

(12) United States Patent
Jones

(10) Patent No.: US 12,742,357 B2
(45) Date of Patent: Sep. 22, 2026

(54) DOOR LOWERING MECHANISM AND METHOD

(71) Applicant: OVERHEAD DOOR CORPORATION, Lewisville, TX (US)

(72) Inventor: Robert C. Jones, Orrville, OH (US)

(73) Assignee: Overhead Door Corporation, Lewisville, TX (US)

( * ) Notice: Subject to any disclaimer, the term of this patent is extended or adjusted under 35 U.S.C. 154(b) by 318 days.

(21) Appl. No.: 18/498,925

(22) Filed: Oct. 31, 2023

(65) Prior Publication Data

US 2024/0060365 A1 Feb. 22, 2024

Related U.S. Application Data

(63) Continuation of application No. 16/669,222, filed on Oct. 30, 2019, now Pat. No. 11,851,948.

(51) Int. Cl.

| | |
|---|---|
| ***E06B 9/80*** | (2006.01) |
| ***E05F 11/04*** | (2006.01) |
| ***E05F 11/54*** | (2006.01) |
| ***E06B 9/78*** | (2006.01) |
| ***E06B 9/82*** | (2006.01) |

(52) U.S. Cl.

CPC ................ *E06B 9/82* (2013.01); *E05F 11/04* (2013.01); *E05F 11/54* (2013.01); *E06B 9/78* (2013.01); *E05Y 2900/146* (2013.01); *E06B 2009/785* (2013.01); *E06B 2009/807* (2013.01)

(58) Field of Classification Search

CPC ........ E06B 9/80; E06B 2009/807; E06B 9/82; E06B 9/84; E06B 9/90; E06B 2009/785; E06B 9/08; E06B 9/17; E06B 2009/905; E05Y 2900/146; E05F 11/04; E05F 11/54; F16D 55/08; F16D 55/30; F16D 2125/20; F16D 13/752; F16D 13/75

See application file for complete search history.

(56) References Cited

U.S. PATENT DOCUMENTS

| | | | |
|---|---|---|---|
| 1,270,964 | A | 7/1918 | Mccloud |
| 2,374,829 | A | 5/1945 | Nardone |
| 3,420,121 | A | 1/1969 | Stieg |
| 3,752,208 | A | 8/1973 | Roberts |
| 4,147,197 | A | 4/1979 | Bailey et al. |

(Continued)

FOREIGN PATENT DOCUMENTS

| | | | | |
|---|---|---|---|---|
| DE | 19817317 A1 | 10/1999 | | |
| DE | 10132107 A1 * | 10/2002 | ............... | E06B 9/80 |

OTHER PUBLICATIONS

Machine translation DE10132107 (Year: 2002).*

*Primary Examiner* — Abe Massad
*Assistant Examiner* — Jeremy C Ramsey
(74) *Attorney, Agent, or Firm* — Haynes and Boone, LLP

(57) ABSTRACT

An adjustable door braking system including a shaft, a brake pad configured to be mounted to the shaft, a plate configured to be mounted on the shaft adjacent to the brake pad, a spring, and a threaded adjustment piece. The spring is configured to be coiled around the shaft to urge the plate toward the brake pad. The adjustment piece is dimensioned and sized to be threaded on the shaft on a first side of the plate and is configured to adjust an amount of force with which the spring urges the plate against the brake pad disposed on a second side of the plate as the shaft rotates with respect to the adjustment piece.

13 Claims, 13 Drawing Sheets

(56) References Cited

U.S. PATENT DOCUMENTS

| | | | |
|---|---|---|---|
| 4,470,487 | A | 9/1984 | Blatt |
| 5,139,075 | A | 8/1992 | Desrochers |
| 5,203,392 | A | 4/1993 | Shea |
| 5,245,879 | A | 9/1993 | Mckeon |
| 5,355,927 | A | 10/1994 | McKeon |
| 5,482,103 | A | 1/1996 | Burgess et al. |
| 5,613,321 | A | 3/1997 | Rizkovsky |
| 5,896,907 | A | 4/1999 | Dever et al. |
| 5,931,212 | A | 8/1999 | Mullet et al. |
| 6,014,307 | A | 1/2000 | Crimmins |
| 6,055,885 | A | 5/2000 | Shea |
| 6,123,134 | A | 9/2000 | Thomas et al. |
| 6,196,943 | B1 | 3/2001 | Chen |
| 6,338,412 | B1 | 1/2002 | Serres et al. |
| 6,401,792 | B1 | 6/2002 | Mullet et al. |
| 6,422,965 | B1 | 7/2002 | Balli et al. |
| 6,484,784 | B1 | 11/2002 | Weik, III et al. |
| 6,530,863 | B2 | 3/2003 | Balli et al. |
| 6,712,116 | B2 | 3/2004 | Beaudoin et al. |
| 6,737,823 | B2 | 5/2004 | Reed et al. |
| 6,890,279 | B2 | 5/2005 | Ryberg |
| 6,959,751 | B2 | 11/2005 | Savard et al. |
| 6,986,378 | B2 | 1/2006 | Beaudoin et al. |
| 7,086,441 | B2 | 8/2006 | Barriault et al. |
| 7,878,230 | B2 * | 2/2011 | Daus ......................... E06B 9/68<br>160/1 |
| 8,397,787 | B1 | 3/2013 | Daus |
| 2002/0111242 | A1 | 8/2002 | Balli et al. |
| 2009/0108245 | A1 | 4/2009 | Daus et al. |
| 2010/0005723 | A1 | 1/2010 | Evans |

* cited by examiner

DOOR LOWERING MECHANISM AND METHOD

RELATED APPLICATIONS

This patent application is a continuation of U.S. patent application Ser. No. 16/669,222 filed Oct. 30, 2019, which is related to application Ser. No. 11/976,363 filed Oct. 24, 2007 now U.S. Pat. No. 7,878,230, issued Feb. 1, 2011, Titled Door Release Mechanism, all of which are hereby incorporated by reference in their entirety.

TECHNICAL FIELD

This patent disclosure relates generally to a door hoist or motor operated door assembly. More particularly, the present disclosure pertains to a device and system for automatically releasing a door in response to an event and providing a governor to slow the decent of the door.

BACKGROUND

Conventionally, door hoist or motor operated systems are utilized to operate a variety of doors. Particular examples of doors operated via a door hoist include rolling type, sectional, and the like. These types of doors are typically utilized for controlling access to garages, ware houses, etc. In the event of a fire, it is generally beneficial to close these doors to limit the amount of oxygen supplied to the fire and slow the spread of fire from one side of the door to the other.

A lot of fire door governors on the market are not adjustable. If the customer or inspector is not satisfied with the drop speed the only option is to adjust spring tension and if that doesn't work the change may require significant time and/or expense. Existing fire door governors also can have two issues in that they are difficult to get them to drop and can accelerate as they drop and slam into the ground.

Accordingly, it is desirable to provide a method and apparatus capable of overcoming the disadvantages described herein at least to some extent.

SUMMARY

The foregoing needs are met to a great extent by embodiments in accordance with the present disclosure, wherein, in some embodiments allows a device and system is provided that in some embodiments automatically releases a door in response to an event.

In another aspect, the disclosure describes an adjustable door braking system. The system includes: a shaft; a brake pad configured to be mounted to the shaft; a plate for mounting on the shaft adjacent to the brake pad; a spring for urging the plate to the brake pad, the spring configured to be mounted on the shaft; a nut dimensioned and sized to be mounted on the shaft for adjusting an amount of force the spring urges the plate against the brake pad.

In yet another aspect, the disclosure describes a method of applying variable amount of braking force to a door depending upon any one of: the speed of the door and a position of the door. The method includes: attaching a brake pad and brake plate to a shaft; configuring a spring to urge the brake plate against the brake pad; mounting an adjustment piece to the shaft; and configuring the adjustment piece to move axially on the shaft as the shaft rotates to thereby vary a force the spring urges against the brake plate.

The disclosure also provides, in another aspect an adjustable door braking system. The system includes: a shaft; a brake pad configured to be mounted to the shaft; a plate for mounting on the shaft adjacent to the brake pad; a spring for urging the plate to the brake pad, the spring configured to be mounted on the shaft; a connecting mechanism for operatively connecting the shaft to a door release mechanism; a brake drum configured to be mounted to the shaft and having a brake shoe pressing against the brake drum when the brake drum rotates; and a nut dimensioned and sized to be mounted on the shaft for adjusting an amount of force the spring urges the plate against the brake pad.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
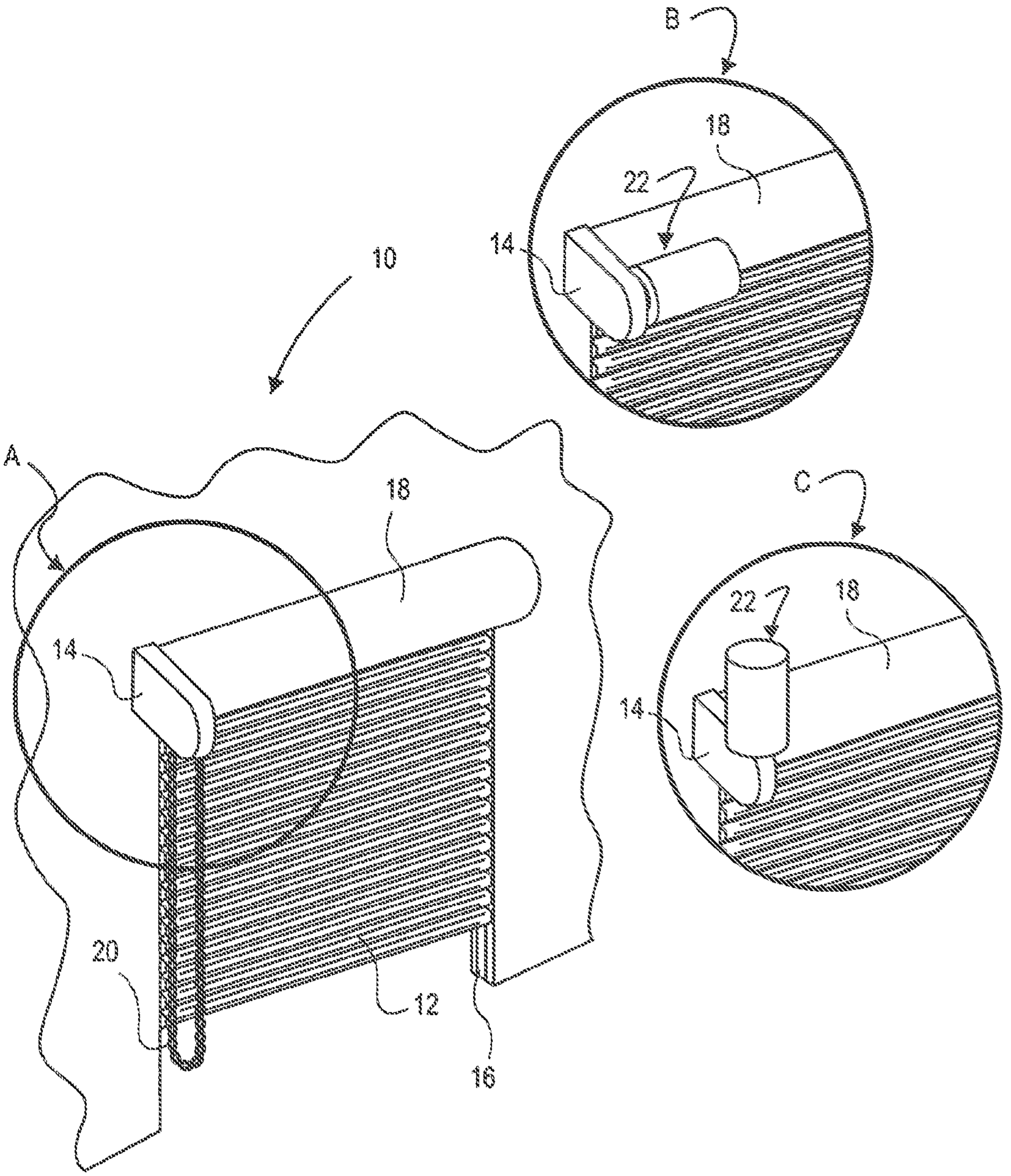
FIG. 1 is a perspective view of a door system according to an embodiment of the invention.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

In various embodiments of the invention a simplified device and system are provided to automatically release a door in response to an event. In a particular example, the device is configured to close a door in the event of a fire. For example, when attached to a door that is biased to close, a release assembly connecting a hoist assembly to the door assembly may be configured to release the door assembly from the hoist assembly in response to a fire or smoke. Released from the hoist assembly, the door may be allowed to close. In another example, the release assembly may be configured to release the door assembly from the hoist assembly in response to a security incident. In yet another example, the release assembly connects the hoist assembly to a door assembly that is biased to open. In this example, the release may be controlled to release the door assembly from the hoist assembly to facilitate egress through the door.

An embodiment of the invention will now be described with reference to the drawing figures, in which like reference numerals refer to like parts throughout. As shown in FIG. 1, a door system 10 includes a door 12 and a hoist 14. The door 12 may include any suitable door or other such covering structure operable to cover an opening. In general, the door 12 may include rollup, swing, sliding, etc. type doors. In a particular example, the door 12 is a conventional rollup type door configured to slide within a track 16 and roll up into a cover 18. Such rollup type doors are well known to include a cylinder or shaft within the cover 18 to operate the door 12. That is, the door 12 is drawn into the cover 18 by rotating the shaft and rolling the door about the shaft or a cylinder connected to the shaft. The door 12 is controlled or allowed to close by rotating the shaft in the opposite direction and/or allowing gravity to draw the door 12 downwards. In this regard, the door 12 is biased in the closed position. A door that is otherwise suitable for use with various embodiments of the invention but is not biased in the closed position may be modified to be biased in the closed position. For example, a spring or weight or other such door closing device may be added to the door.

Figure 2:
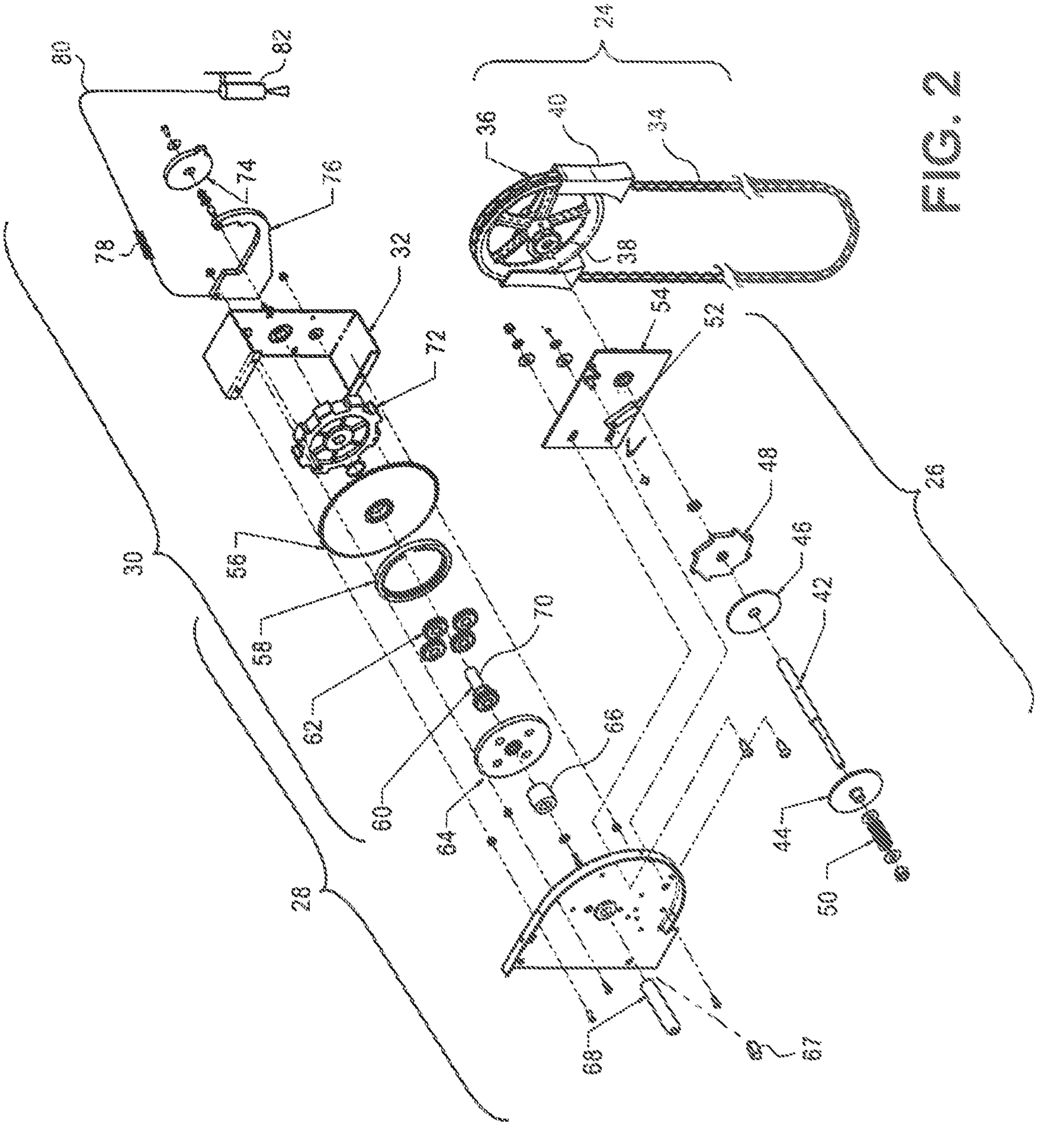
FIG. 2 is an exploded view of the hoist according to an embodiment of the invention.

The hoist 14 according to various embodiments may be operated via any suitable mechanism. In several particular examples shown in insets A, B, and C, the hoist 14 may include a chain drive 20 or motor 22 and the motor 22 may be mounted vertically or horizontally. A particular example of the chain drive 20 is shown in FIG. 2. Particular examples of vertically and horizontally mounted motors 22 are shown respectively shown in FIG. 1.

FIG. 2 is an exploded view of the hoist 14 according to an embodiment of the invention. As shown in FIG. 2, the hoist 14 includes a chain hoist wheel assembly 24, unidirectional brake assembly 26, drive assembly 28, door release assembly 30, and bracket 32. The chain hoist wheel assembly 24 is optional and in this or other embodiments, any suitable actuator may be substituted. For example, the motor 22 may replace the chain hoist assembly 28. If present, the chain hoist assembly 24 includes a chain 34, chain hoist wheel 36, chain drive sprocket 38, chain guards 40, and chain hoist shaft 42. To operate the door 12, the chain 34 may be pulled by a user to urge the chain hoist wheel 36 to rotate. The chain drive sprocket 38 is integral to or fastened to the chain hoist wheel 36. As a result, rotation of the chain hoist wheel 36 induces a corresponding rotation of the chain drive sprocket 38. In turn, operation of the chain hoist wheel assembly 24 urges the drive assembly 28 to raise or lower the door 12. As is generally known, inducing a rotation of the drive assembly 28 in a first direction causes the door 12 to raise and inducing an opposite rotation causes the door 12 to lower.

The unidirectional brake assembly 26 is optionally included to accompany actuating assemblies that lack sufficient self-braking characteristics. If present, the unidirectional brake assembly 26 includes a brake pressure plate 44, brake pad 46, ratcheted pressure plate 48, spring 50, pawl 52, and mounting plate 54. The brake pressure plate 44, brake pad 46, ratcheted pressure plate 48, and spring 50 are mounted to the chain hoist shaft 42. The brake pressure plate 44 is pinned or otherwise fixed to rotate with the chain hoist shaft 42. The pawl 52 is mounted to the mounting plate 54 or the bracket 32. The ratcheted pressure plate 48 includes one or more detents or teeth to engage the pawl 52. In this manner, the ratcheted pressure plate 48 is configured to rotate in a first direction and the ratcheted pressure plate 48 is stopped from rotating in a reverse rotational direction by the interaction of the pawl 52 and teeth.

The chain hoist wheel assembly 24 shown in FIG. 2 may provide so little rotational resistance that, barring additional intervention, the door 12 may tend to fall closed. To reduce this tendency, the unidirectional brake assembly 26 is configured to provide resistance to rotation which results in a downward movement of the door 12. To ease the operation of raising the door 12, the unidirectional brake assembly 26 rotates substantially freely in the direction of rotation that raises the door 12.

In other instances, the chain hoist wheel assembly 24, motor 22, or other such actuator may provide sufficient rotational resistance to retain the door 12 in an open position. For example, a worm gear (shown in FIG. 8) may be employed to urge the drive assembly 28 to rotate. The direction of torque transmission (input shaft vs. output shaft) is not reversible in conventional worm gear trains. In this or other such instances, the unidirectional brake assembly 26 may be omitted.

The drive assembly 28 according to various embodiments provides a simplified gear train in comparison to conventional door hoists. This simplified gear train reduces the material and labor costs, reduces the size of the hoist 14, and may increase reliability. It is a further advantage of the drive assembly 28 that the door release assembly 30 is fully integrated into this simplified gear train and shares components therewith. This further simplifies the door system, which results in a further reduction of material and labor costs.

As shown in FIG. 2, the drive assembly 28 includes a drive sprocket 56, annulus or ring gear 58, sun gear 60, set of planetary gears 62, hub assembly 64, and connector 66. The drive sprocket 56 is arranged or configured to mate with the chain drive sprocket 38 or similar such gear of the motor 22 or other such actuator. In an embodiment, the ring gear 58 is integral to or fixed to the drive sprocket 56. In a particular example, the ring gear 58 is welded to the drive sprocket 56 with a central or rotational axis of the ring gear 58 coinciding with a central axis of the drive sprocket 56. The sun gear 60 is disposed to coincide with the central axis of the ring gear 58. The set of planetary gears 62 is disposed between the ring gear 58 and the sun gear 60 and configured to mate with both. While the number of individual planetary gears in the set of planetary gears 62 may vary, such gear trains typically include at least a pair, and more typically four, individual planetary gears to balance and distribute loads throughout the gear train. The hub assembly 64 may serve as a planet carrier for the set of planet gears 62. In this capacity, the ring gear 58 functions as the input shaft, the rotation of which causes the set of planet gears 62 to rotate about a fixed sun gear 60 and the hub assembly 64 is the output shaft to operate the door 12. In this regard, the connector 66 is fixed to the hub assembly 64. The connector 66 is configured to receive and rotationally secure a door shaft 68. The door shaft 68 operates the door 12 and may be secured to the connector 66 in any suitable manner. In a particular example, the door shaft 68 includes a channel for a spline 67, the connector 66 includes a channel for the spline 67, and the door shaft 68 and connector 66 are locked in rotational alignment by the insertion of the spline 67 into the channel. In other examples, the door shaft 68 and connector 66 may include mating "D" or square configurations, and/or may be welded, press fit, or otherwise fastened together.

In another embodiment, the ring gear 58 is integral to or fixed to the hub assembly 64 and the set of planetary gears 62 are rotationally mounted to the sprocket 56. That is, the sprocket 56 may serve as a planet carrier for the set of planet gears 62. In addition, other arrangements of the gear train are within the scope of the invention.

The door release assembly 30 includes a governor shaft 70, governor 72, plate 74, drop arm 76, and link 78. The governor shaft 70 is secured to the sun gear 60. In various examples, the sun gear 60 may be press fit, pinned, splined, or otherwise fixed to the governor shaft 70. The governor 72 includes any suitable governing device such as, for example, a viscous governor, mechanical, brake-type governor, and the like. The governor 72 includes a hub that is fixed to the governor shaft 70. The plate 74 is secured to the governor shaft 70. In various examples, the plate 74 may be press fit, pinned, splined, or otherwise fixed to the governor shaft 70. The plate 74 includes at least one point or tooth configured to engage a corresponding point, indent, or tooth on the drop arm 76. The drop arm 76 includes two ends. A first end is pivotally fixed with respect to the plate 74. The second end is secured via the link 78. In this secured position, the drop arm 76 and the plate 74 are configured to preclude rotation of the governor shaft 70. In response to removal of the link 78 or loss of structural integrity of the link 78, the drop arm 76 is allowed to swing or pivot about the first end and disengage from the plate 74. In this disengaged position, the plate 74 and therefore the governor shaft 70 are free to rotate.

Figure 4:
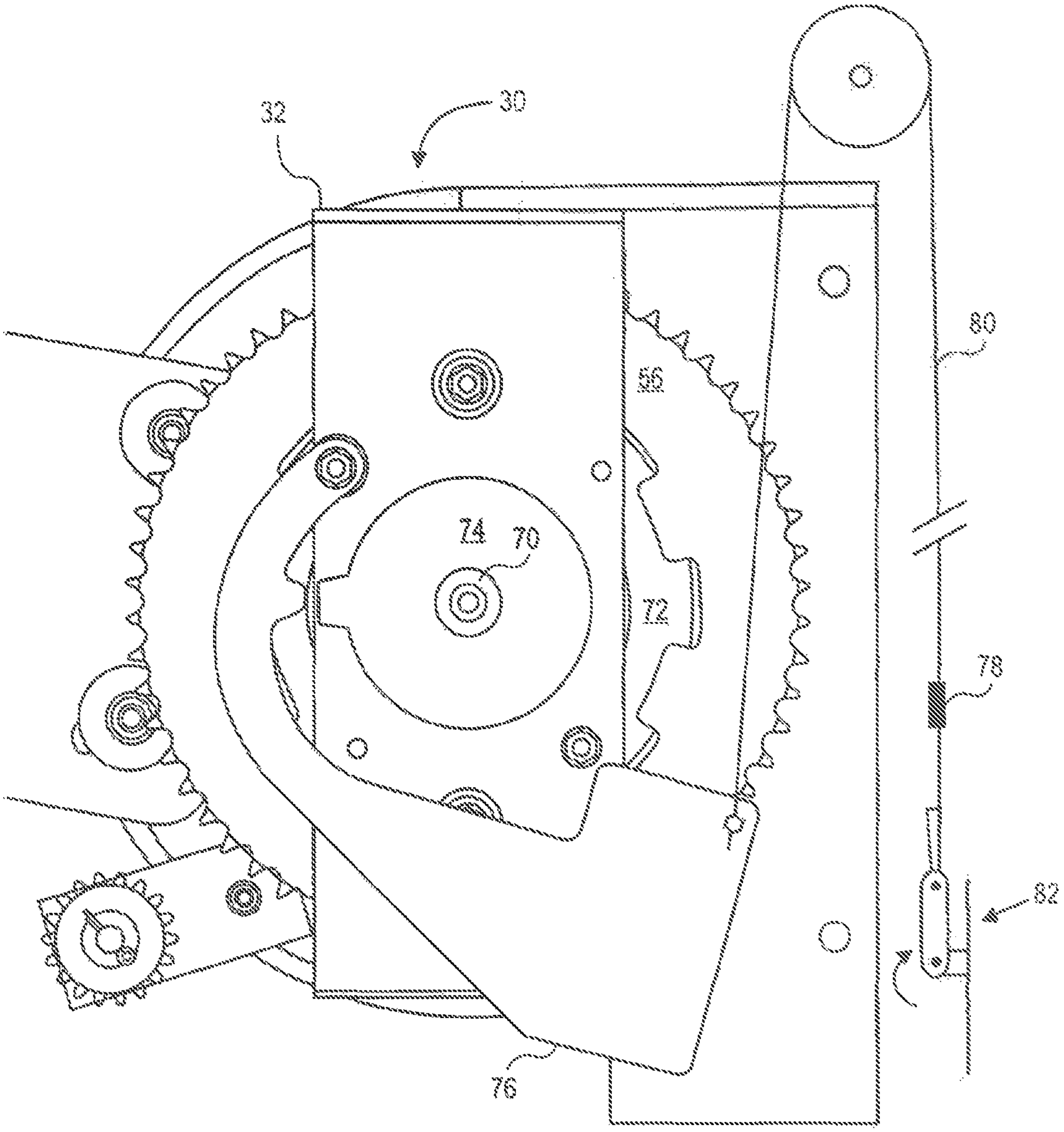
FIG. 4 is a simplified view of the release assembly in a disengaged position according to the embodiment of FIG. 3.
Figure 5:
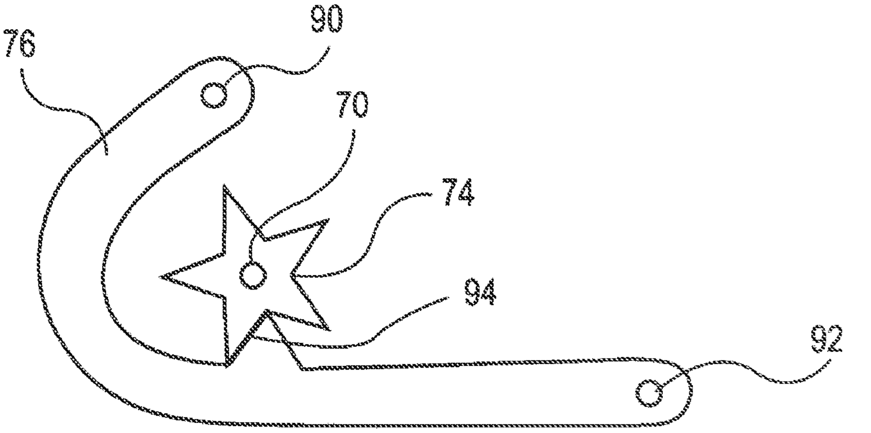
FIG. 5 is a simplified view of a release assembly in an engaged position according to another embodiment of the invention.

According to an embodiment of the invention, at a predetermined temperature, the link 78 is configured to soften, melt, or otherwise lose sufficient structural integrity to retain the drop arm 76. The predetermined temperature may be set according to a variety of factors. These factors may include, for example, expected normal ambient temperature, manufacture's recommendation, empirical data, and the like. To facilitate manual operation and/or testing of the door system 10, the link 78 may be attached to the drop arm 76 via a line 80 and the line 80 may be attached to a handle or switch 82. As shown in FIGS. 4 and 5, the switch 82 may be moved from a first to a second position to control the drop arm 76. In another example, the link 78 may pass through a hole in the bracket 32 to secure the drop arm 76 and a ring or handle may remain outside of a housing. In this manner, the ring provides a gripping surface to remove the link 78 and is readily available to test the door system 10.

According to another embodiment, the link 78 may include an electronic release device such as, for example, an electromagnetically coupled link, solenoid release device, or the like. In this embodiment, the link 78 may release the drop arm 76 in response to any suitable event such as, for example, a smoke alarm activation, security event, manual activation of a switch, and the like.

Figure 3:
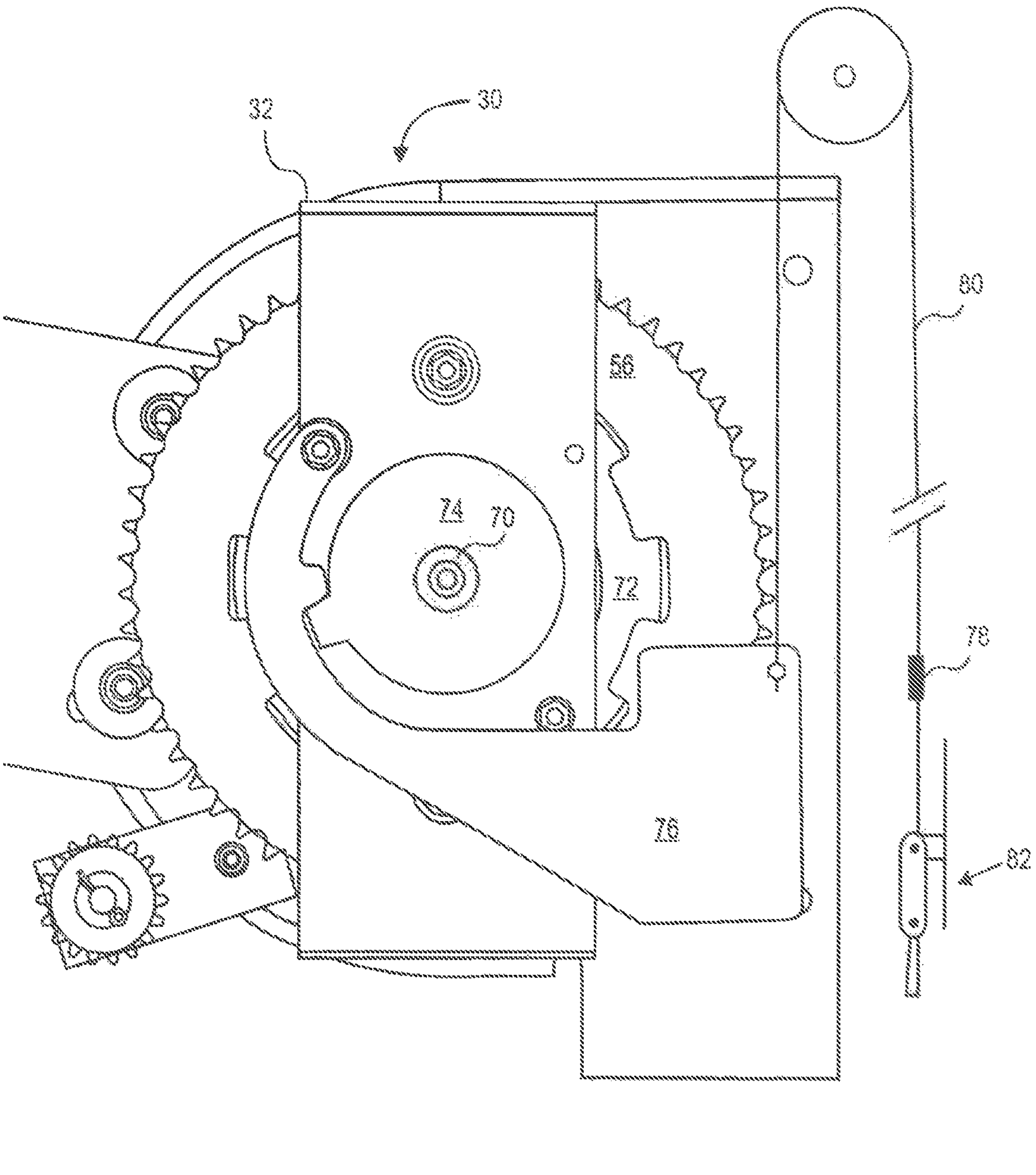
FIG. 3 is a simplified view of a release assembly in an engaged position according to an embodiment of the invention.

FIG. 3 is a simplified view of the drop arm 76 and plate 74 in the engaged position according to FIG. 2. As shown in FIG. 3, the drop arm 76 is secured to the link 78 via the line 80. In addition, the switch 82 is shown in a first configuration. In this first configuration, the line 80 is controlled to retain the drop arm 76 in the engaged position. When secured in the engaged position, the drop arm 76 and plate 74 lock together to prevent the plate 74 from turning. In turn, the governor shaft 70 is prevented from turning by the engaged plate 74. That is, the governor shaft 70 is rotationally fixed relative to the bracket 32 in response to the door release assembly 30 being in the engaged position.

FIG. 4 is a simplified view of the drop arm 76 and plate 74 in the disengaged position according to FIG. 2. As shown in FIG. 4, in response to disposing the switch 82 in a second position or compromising the structural integrity of the link 78, the drop arm 76 is configured to drop from the engaged position. As the drop arm 76 pivots away from the plate 74, the plate 74 is free to rotate. In this manner, the door release assembly may be controlled to release the door 12. Depending upon the bias of the door 12, releasing the release assembly may raise or lower the door 12. In a particular example, the door 12 may be biased to close and the door system 10 is configured to automatically close the door 12 in response to the ambient temperature exceeding the predetermined temperature. It is an advantage of the door system 10 that this automatic closure may proceed in a complete absence of electrical power. It is another advantage of the door system 10 that this automatic closure may proceed even if the chain drive 20 or motor 22 is disabled. It is a further advantage of the door system 10 that the system is easier and less expensive to maintain than an electronically controlled door closing system.

In another example, the link 78 may be electronically controlled to disassemble or otherwise release the line 80. In this example, the link 78 may be controlled to release the line 80 in response to the activation of a smoke alarm or security system activation.

In yet another example, the door 12 may be biased to fully or partially open. For example, in response to the drop arm 76 being released, a closed door 12 may be allowed to fully or partially open. In a particular example, if the door 12 provides an egress for a facility and the door 12 is closed, the door release assembly 30 may be automatically or manually controlled to release to door 12. In this manner, egress through the door 12 may be facilitated.

FIG. 5 is a simplified view of the drop arm 76 and plate 74 in the engaged position. As shown in FIG. 5, the drop arm 76 includes a pivot point 90 and a link point 92. The pivot point 90 may be pivotally connected to the bracket 32 or other such structural member via a shaft, bolt, rivet, or the like. The link point 92 is secured via the link 78 to the bracket 32 or other such structural member of the door system 10. When secured in the engaged position, the drop arm 76 and plate 74 lock together at an engagement interface 84 to prevent the plate 74 from turning. In turn, the governor shaft 70 is prevented from turning by the engaged plate 74. That is, the governor shaft 70 is rotationally fixed relative to the bracket 32 in response to the door release assembly 30 being in the engaged position.

As shown in FIGS. 2, 3, and 4, the link 78 may be secured to the link point 92 via a line 80. In another embodiment, the link 78 may be inserted through the link point 92 and into the bracket 32 or other such structural member. In this embodiment, by altering an angle of the engagement interface 94, the torque being applied to the plate 74, and a length relationship between the pivot point 90, engagement interface 94, and link point 92, an amount of sheer force exerted upon the link 78 may be adjusted. By configuring the structural integrity of the link 78 to fall below the sheer force at the predetermined temperature, the drop arm 76 may be controlled to disengage at the predetermined temperature.

Figure 6:
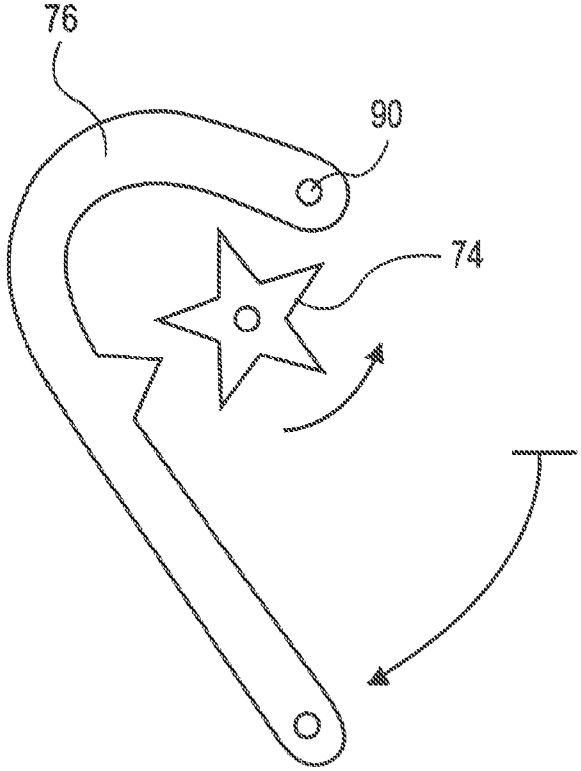
FIG. 6 is a simplified view of the release assembly in a disengaged position according to the embodiment of FIG. 5.

FIG. 6 is a simplified view of the drop arm 76 and plate 74 in the disengaged position according to FIG. 5. As shown in FIG. 6, in response to removal of the link 78 from the link point 92 or the structural integrity of the link 78 failing or falling below the sheer force exerted on the link 78, the drop arm 76 is configured to drop from the engaged position. As the drop arm 76 pivots away from the engagement interface 94 (shown in FIG. 2) the plate 74 is free to rotate.

As shown in FIG. 2, the free rotation of the plate 74 decouples the drive sprocket 56 from the drive assembly 28. That is, the rotational relationship between the drive sprocket 56 and the hub assembly 64 is decoupled. As such, the door 12 is free to close or open in accordance with the bias of the door 12. To control the rate at which the door 12 opens or closes, the rotation of the governor shaft 70 is controlled by the governor 72. In this regard, a hub of the governor 72 is secured to the governor shaft 70 and a housing of the governor 72 is secured to the bracket 32 or suitable structural member. The hub and housing of the governor 72 interact with one another via a viscous fluid or other such braking mechanism. The degree to which the governor 72 slows rotation of the governor shaft 70 may be determined based upon a variety of factors such as, for example, weight or closing bias of the door, fire door closing regulations, empirical data, and the like.

Figure 7:
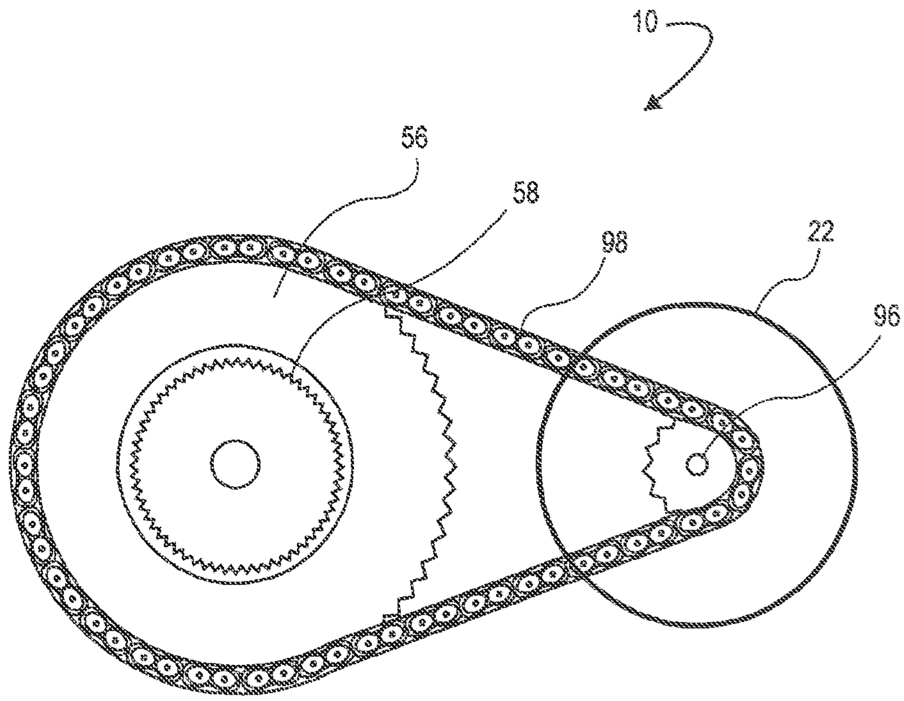
FIG. 7 is a detailed view of a horizontally oriented actuator engaging a drive sprocket according to another embodiment of the invention.

FIG. 7 is a detailed view of a horizontally oriented actuator engaging the drive sprocket 56 according to another embodiment of the invention. As shown in FIG. 7, the door system 10 includes a motor sprocket 96 that is rotated by the motor 22. In various embodiments, the motor sprocket 96 may directly engage the drive sprocket 56 or, as shown in FIG. 5, a chain 98 may engage both the motor sprocket 96 and the drive sprocket 56 and may be configured to transmit rotation of the motor sprocket 96 to the drive sprocket 56. In another example, the motor sprocket 96 and the drive sprocket 56 may be replaced with pulleys and the chain 98 may be replaced with a belt. These and other such transmission systems are within the purview of various embodiments of the invention.

Figure 8:
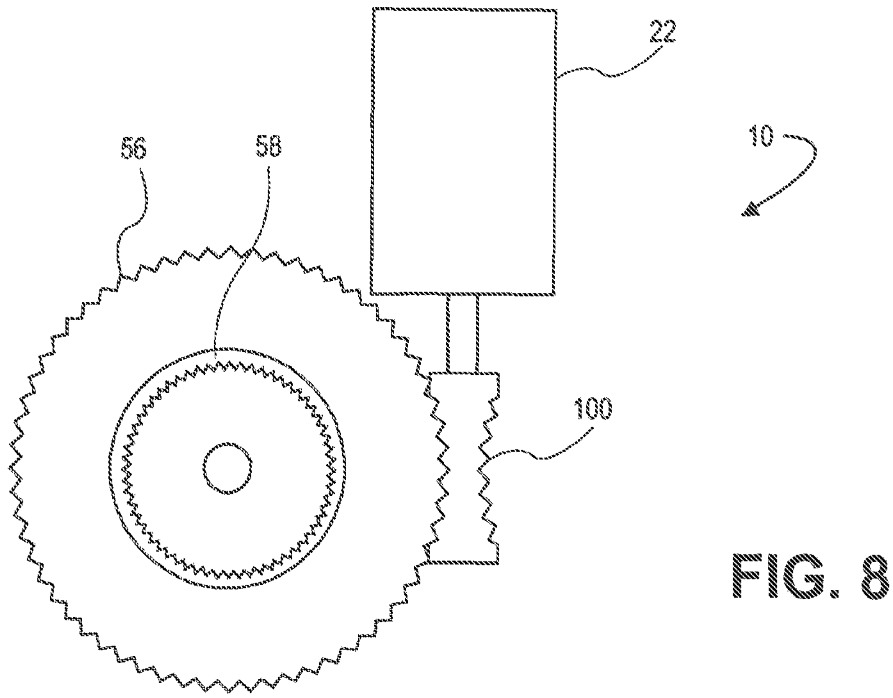
FIG. 8 is a detailed view of a vertically oriented actuator engaging a drive sprocket according to yet another embodiment of the invention.

FIG. 8 is a detailed view of a vertically oriented actuator engaging a drive sprocket 56 according to yet another embodiment of the invention. As shown in FIG. 6, the door system 10 includes a worm gear 100 that is rotated by the action of the motor 22. The worm gear 100 is configured to engage the drive sprocket 56 and urge the drive sprocket 56 to rotate in response to rotation of the worm gear 100. It is an advantage of such a worm drive that rotation is unidirectionally transmitted.

Figure 9:
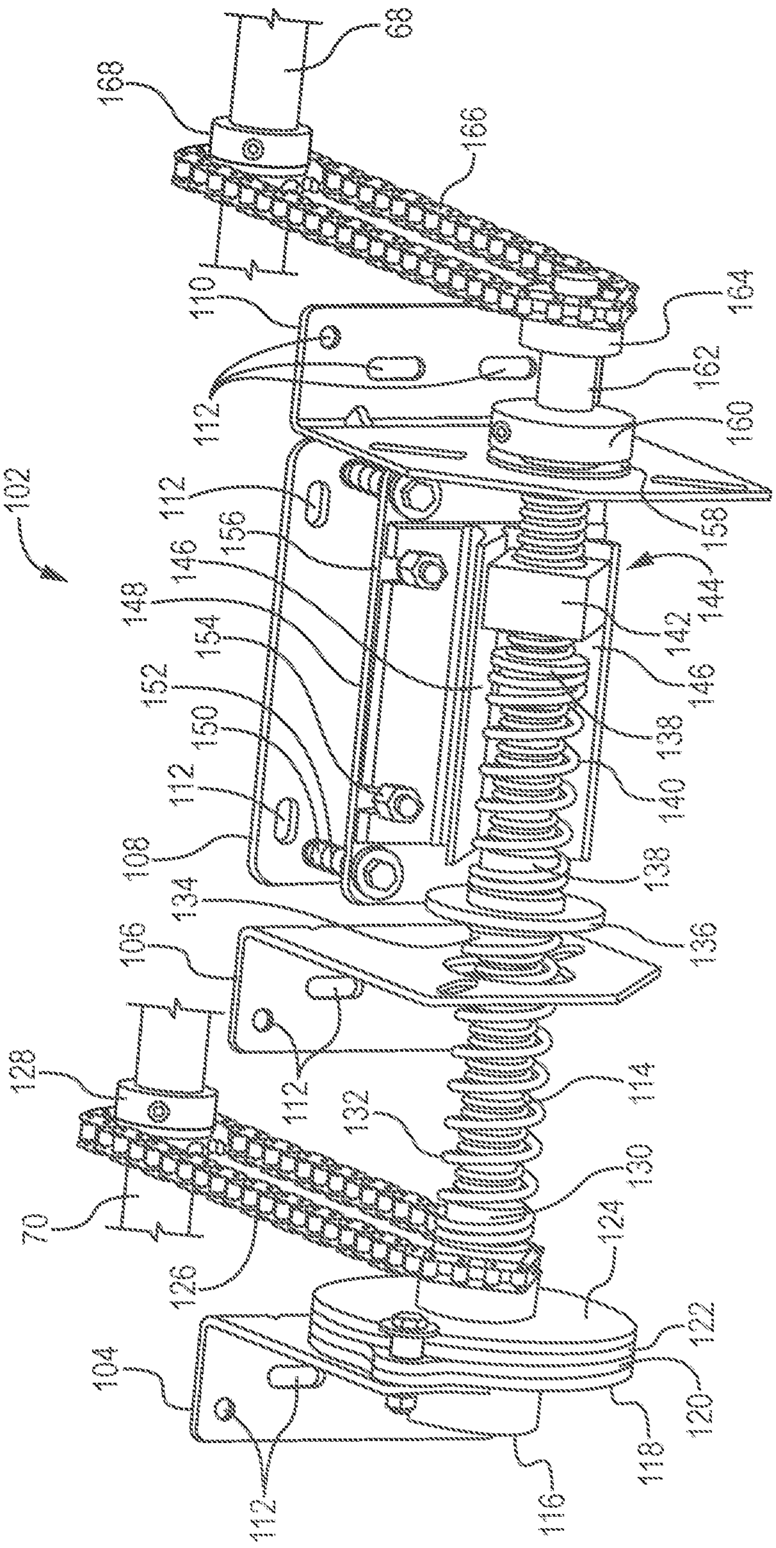
FIG. 9 is a perspective view of an adjustable progressive brake governor assembly.
Figure 10:
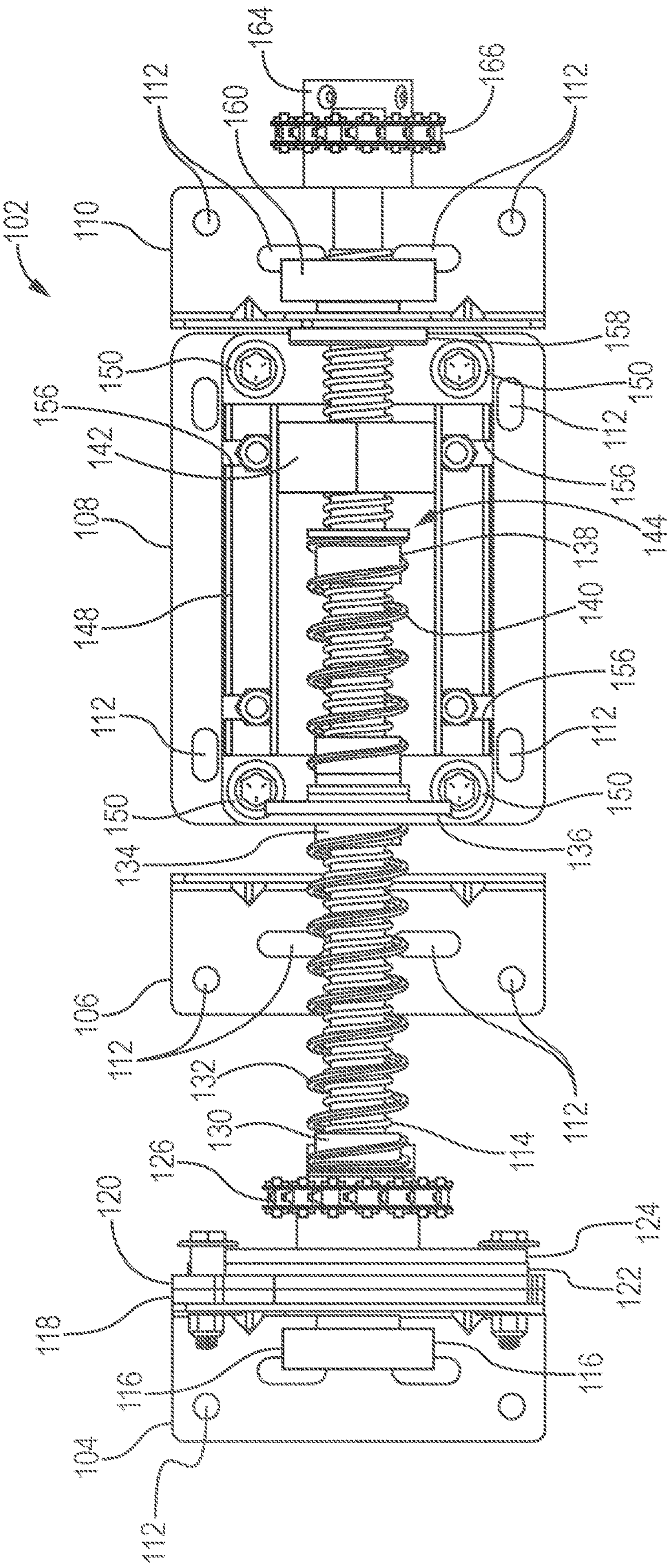
FIG. 10 is a front view of an adjustable progressive brake governor assembly.
Figure 11:
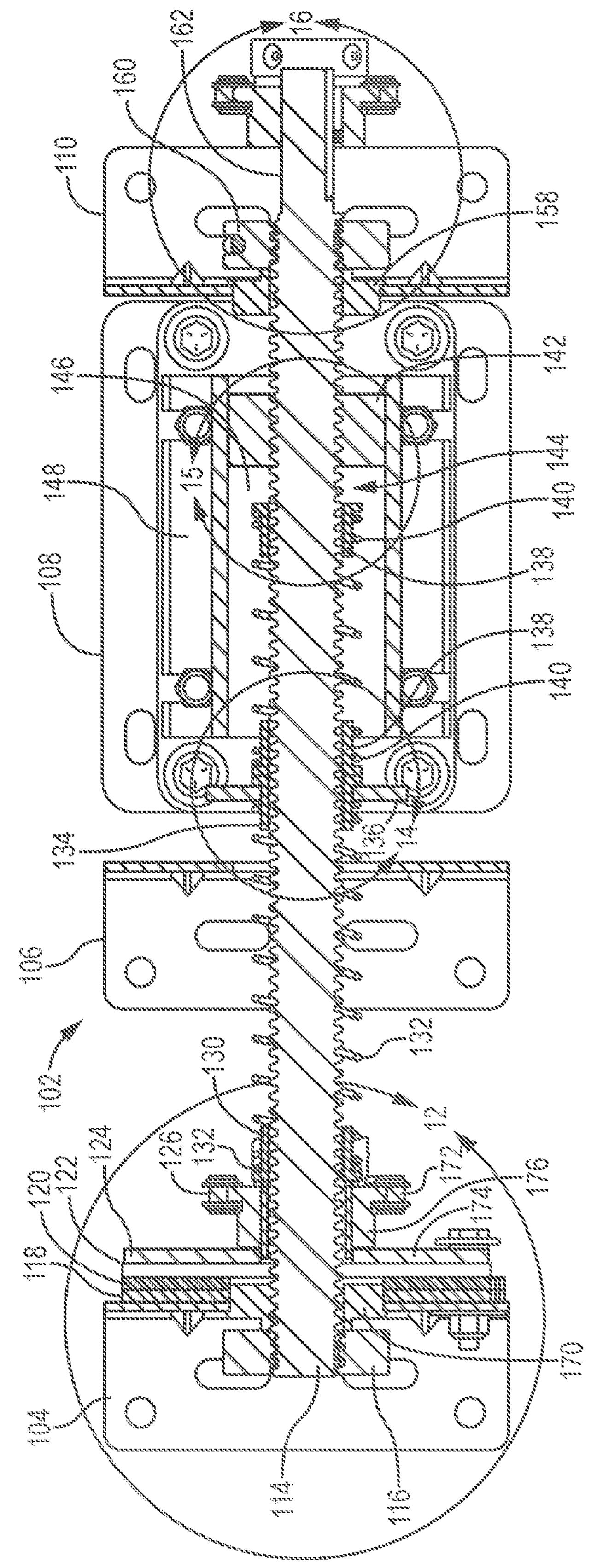
FIG. 11 is a cross-sectional view of the adjustable progressive brake governor assembly.
Figure 12:
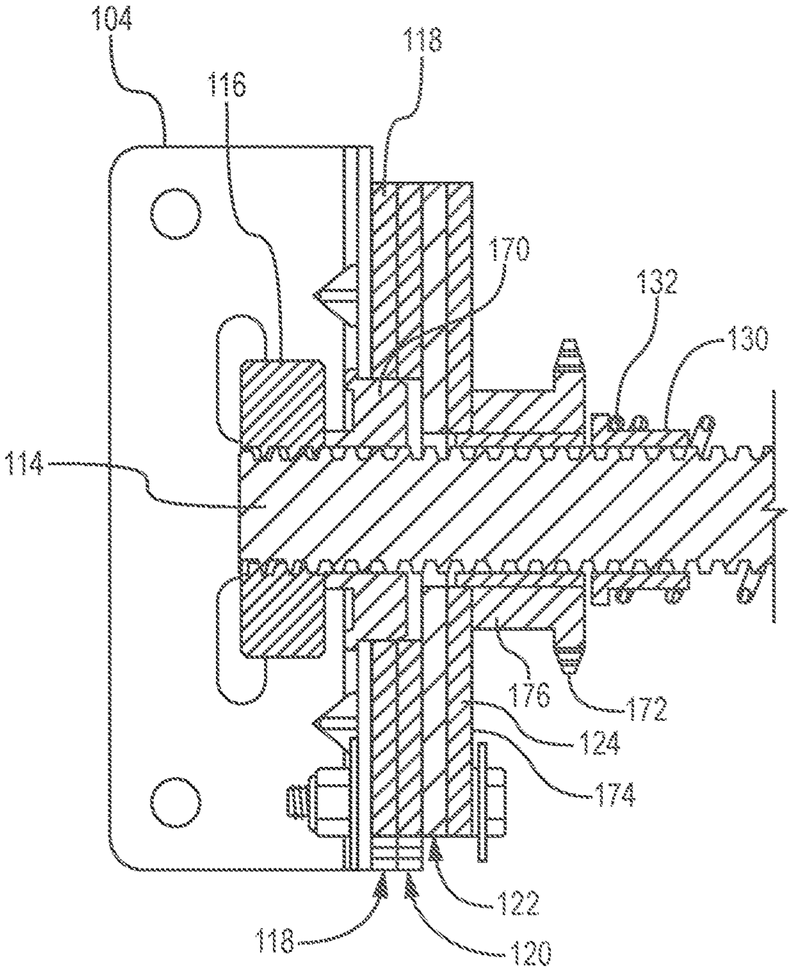
FIG. 12 is an enlarged cross-sectional view of the portion of FIG. 11 marked 12.
Figure 13:
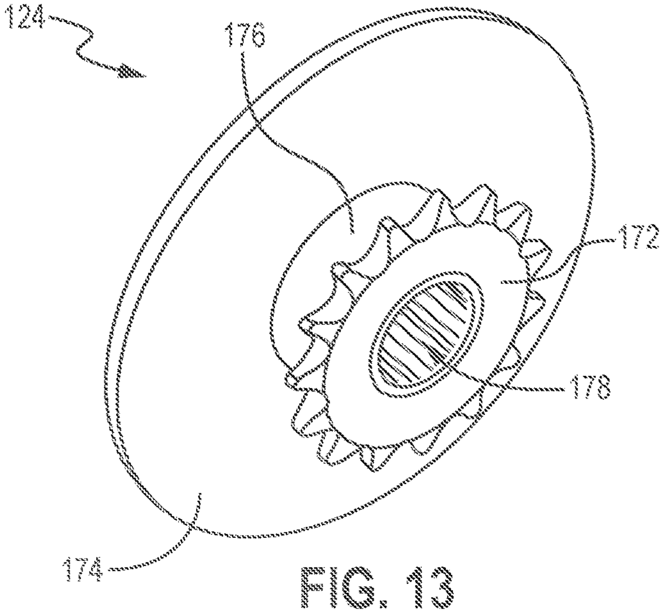
FIG. 13 is a perspective view of a portion of a brake governor assembly.
Figure 14:
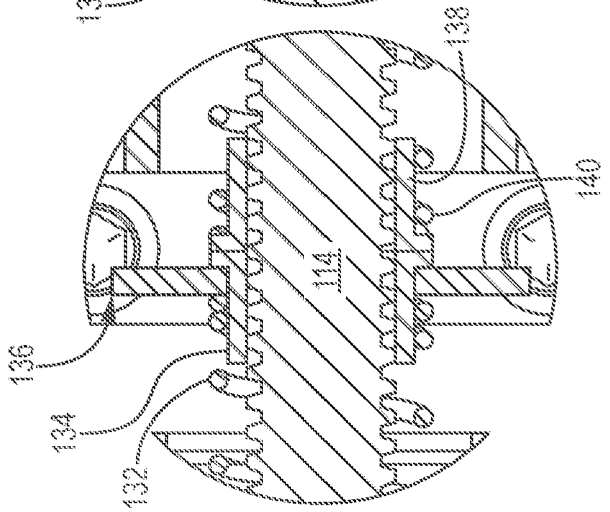
FIG. 14 is an enlarged cross-sectional view of the portion of FIG. 11 marked 14.
Figure 15:
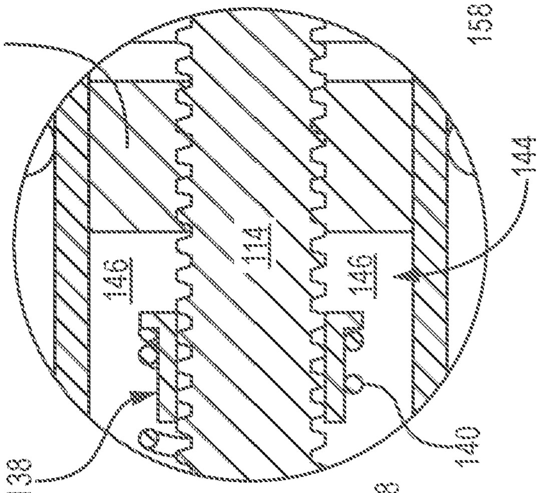
FIG. 15 is an enlarged cross-sectional view of the portion of FIG. 11 marked 15.
Figure 16:
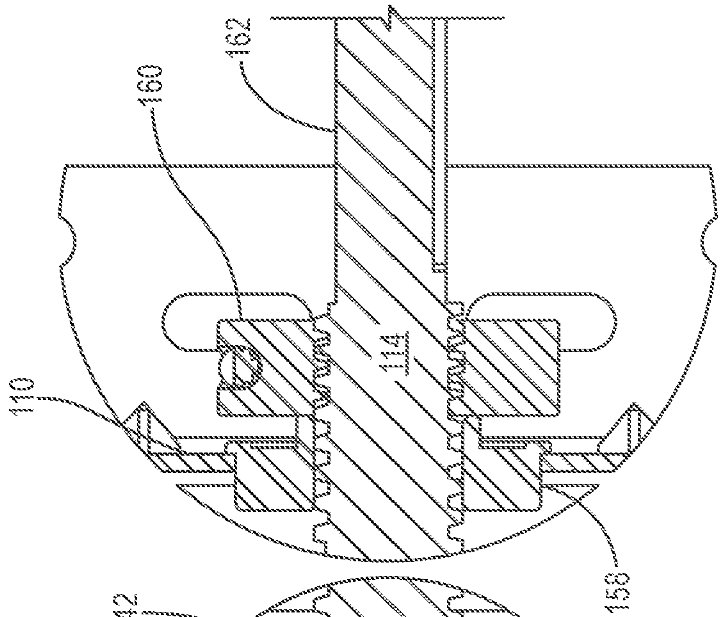
FIG. 16 is an enlarged cross-sectional view of the portion of FIG. 11 marked 16.

FIGS. 9-18 show alternate governor assemblies 102 that may be used in place of the governor 72 of the door release assembly 30 of the embodiments shown in FIGS. 1-8. FIGS. 9-10 are front and perspective views of an adjustable governor assembly 102. FIG. 11 is a cross section view of the governor assembly 102. FIGS. 12 and 14-16 are enlarged cross-sectional views. FIG. 13 is a perspective view of a portion of the governor assembly 102. Unless otherwise specified, the following description refers to FIGS. 9-16.

The adjustable progressive brake governor assembly 102 incudes a left mounting bracket 104, a middle mounting bracket 106, a mounting plate 108 and a right mounting bracket 110. The mounting brackets 104, 106, 110 and the mounting plate 108 have mounting holes and/or slots 112 that allow fasteners to attach the mounting brackets 104, 106, 110 and the mounting plate 108 to a wall or directly to a release mechanism. The mounting brackets 104, 106, 110 and the mounting plate 108 allow the governor mechanism or assembly 102 to be mounted to a wall at a location that does not interfere with the door release assembly 30 or related components.

Figure 18:
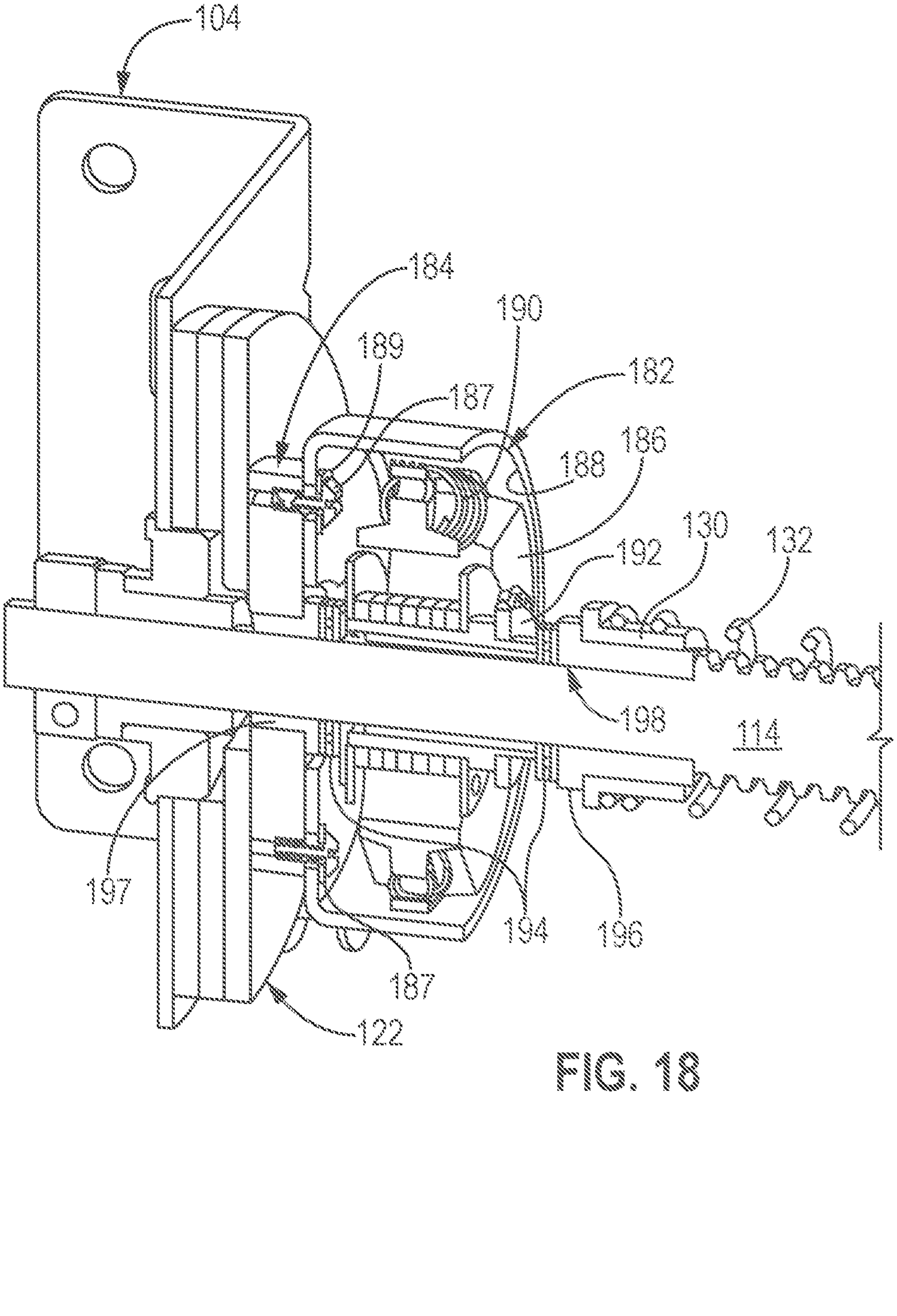
FIG. 18 is a cross-sectional view of an embodiment of an adjustable governor assembly.

The mounting brackets 104, 106, 110 and the mounting plate 108 support the threaded shaft 114. A threaded collar (or in some embodiments not threaded if the shaft is stepped. Collar could also be replaced by a retaining ring or pin also.) 116 is mounted to one end of the threaded shaft 114 and keeps the threaded shaft 114 from axially moving so far to the right as to leave the left mounting bracket 104. A spacer plate 118 (or in some embodiments 118 and 120 can be one plate/spacer) is located between the brake plate 120 (also mounted on the threaded shaft 114) and the bracket 104. A brake pad 122 is attached to brake plate 120. The brake pad 122 may be made of any suitable brake pad material. A sprocket/bushing/plate/brake assembly 124 (best shown in FIG. 13) is mounted to the threaded shaft 114. It is contained from moving axially away from the bracket 104 by a screw/nut/spacer assembly. Alternately this containment can be accomplished with a stepped shaft as shown in FIG. 18. In some embodiments, the sprocket/bushing/plate/brake assembly 124 may be a single unified part as shown, in other embodiments, the sprocket/bushing/plate/brake assembly 124 may be several individual parts.

The sprocket/bushing/plate/brake assembly 124 is mounted on the shaft 114 (which in some embodiments is threaded). FIGS. 11 and 12 show a bearing 170 supporting the shaft 114 through the bracket 104. As shown in FIGS. 12 and 13, the sprocket/bushing/plate/brake assembly 124 includes a sprocket portion 172, a plate portion 174, and a shaft portion 176. The brake plate could be welded, pinned, or bonded to the sprocket. A through hole 178 allows the sprocket/bushing/plate/brake assembly 124 to be mounted on the shaft 114. As shown in FIGS. 9 and 10 the sprocket portion 172 is operatively connected to a chain 126 (some embodiments could use gearing or belts instead of chain) and a dampening sprocket 128 which may be mounted to a governor shaft 70 which is part of the door release assembly 30 (See FIG. 2) of a door system 10 (see FIG. 1).

In some embodiments, the sprocket 128 may be located on the governor shaft 70 at the location of where the governor 72 is located in the embodiments shown in FIGS. 1-8. In other embodiments, the dampening sprocket 128 may be located elsewhere on the governor shaft 70, the door shaft 68 or to a different mechanism shaft. By using the governor assembly 102 rather than the governor 72 of the embodiments shown in FIGS. 1-8 the shaft 114 and (therefor the governor shaft 70) is braked in a manner described later below. The chain 126 and dampening sprocket 128 will brake or dampen the governor shaft 70 thereby limiting a speed in which a door 12 (See FIG. 1) may descend or move to a closed position.

As shown in FIGS. 9-12 and 17-18, a sprocket bushing 130 is loosely mounted to the shaft 114 and presses or urges against the sprocket/bushing/plate/brake assembly 124 when acted upon by the spring 132. The spring 132 is mounted to the shaft 114 and is bound at one end by the sprocket bushing 130 and a washer bushing 134 at the other end.

The washer bushing 134 is located next to a washer 136. The washer 136 is slid over the bushing up to the flange and contained between the flange and spring. Spring bushings 138 are slid over the shaft 114 and supported by the shaft 114 and are located at either end of a second spring 140. The washer 136 is sized so it cannot not fit through the middle mounting bracket 106. As a result, an amount of force (and the distance the spring 132 can be compressed) by the action of the second spring 140 is limited or capped. This limiting action is optional and not always used. In a configuration where no limiting is used, only one spring is needed and bracket 106 can be removed.

An adjustment piece 142 (such as, but not limited to, a lead screw nut or standard nut) is mounted to the shaft 114 and may be adjusted to compress the spring 140. In some embodiments, the adjustment piece 142 may be an adjustment nut 142. In some embodiments the adjustment nut 142 is threadably engaged with threads on the shaft 114. Thus, by turning the shaft 114 and/or the nut 142, the nut 142 may move axially with respect to the shaft 114. By adjusting the position of the nut 142 on the shaft 114, the spring 140 is further compressed when the nut 142 is moved to the left as shown in the FIGS. or partially or fully relieved when the nut 142 is moved to the right as shown in the FIGS. In this manner, moving the nut 142 axially with the respect to the shaft 114 adjusts the amount of force exerted on the spring 140 which affects spring 132 and therefore how hard the sprocket/bushing/plate/brake assembly 124 pushes against the brake pad 122. As a result, adjusting the nut 142 affects how much braking is done by the sprocket/bushing/plate/brake assembly 124 and the brake pad 122.

As mentioned above, the washer 136 is sized to not be able to move through the middle mounting bracket 106 so once the spring 140 has pushed the washer 136 against the mounting bracket 106 no further adjustment of the nut 142 to the left will produce further force on the spring 132, sprocket/bushing/plate/brake assembly 124, and brake pad 122. As a result, there is a limit on how much braking can occur as a result of axial movement of the nut 142 on the shaft 114.

The nut 142 is contacted by a nut seat 144. The nut seat 144, when engaged with the nut 142, allows the nut 142 to move axially along the shaft 114 while also preventing the nut from rotating. Because the nut 142 is preventing from rotating when the nut seat 144 is engaged with the nut 142, the nut 142 will move axially along the shaft 114 when the shaft 114 rotates. The nut seat 144 has two flat surfaces 146 which engage the nut 142.

The nut seat 144 is mounted to a moveable plate 148. The movable plate 148 can move between an engaged position (as shown in FIG. 9 for example) where the flat surfaces 146 contact the nut 142 and a disengaged position where the flat surfaces 146 do not contact the nut 142 and therefore allow the nut 142 to spin freely. Springs 152 located about the mounting bolts 150 bias the nut seat 144 to the engaged position. The mounting bolts 150 secure the nut seat 144 to the mounting plate 108.

The right mounting bracket 110 supports the right side of the shaft 114. Alternatively, this assembly can be flipped, so right could be left. A bearing 158 supports the shaft 114 through the right mounting bracket 110. A collar 160, which in some embodiments is threaded, is mounted to the shaft 114 and is sized to prevent the shaft 114 from moving axially too far to the left. The shaft 114 to the right of the collar 160 may have an unthreaded portion 162. An optional shaft sprocket 164 may be mounted to the unthreaded portion 162 of the shaft 114. A chain 166 may be operatively connected to the shaft sprocket 164 at one end and a door shaft sprocket 168 at the other end. The door shaft sprocket 168 is mounted to the door shaft 68 or another mechanism with a shaft that moves at the same ratio as the door shaft. Alternately this sprocket combination 164 and 168 could be replaced with gears or pulleys. The door shaft sprocket 168, chain 166 and shaft sprocket 164 can input door position to the adjustable governor assembly 102 where the sprocket/bushing/plate/brake assembly 124, chain 126 and dampening sprocket 128 transmit damping or braking to the governor shaft 70 (the governor shaft is shown in FIG. 3) or to the door shaft 68 through gearing or sprockets that magnify the braking.

Figure 17:
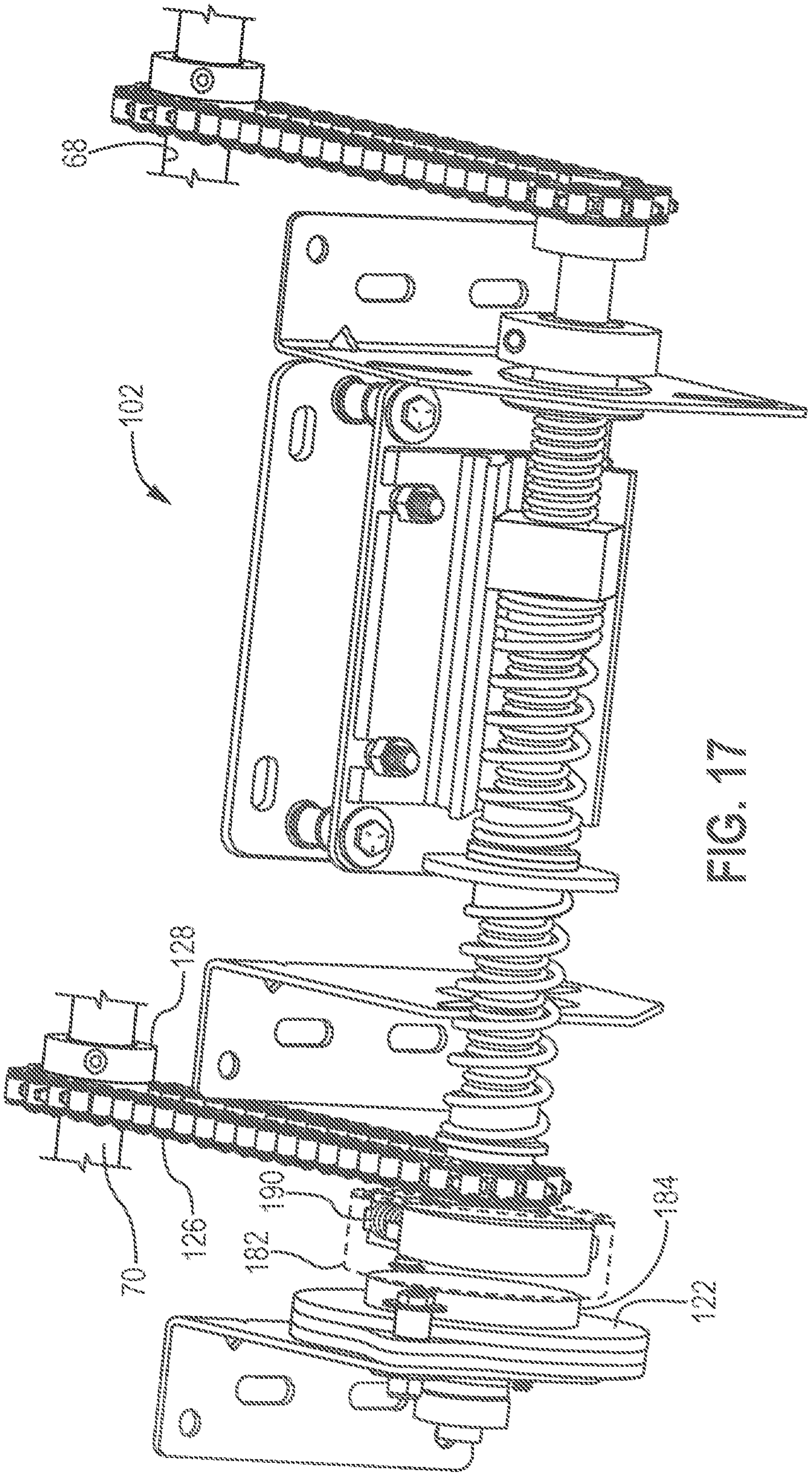
FIG. 17 is a perspective view of an embodiment of an adjustable governor assembly.

FIGS. 17 and 18 illustrate an embodiment where the adjustable governor assembly 102 includes a brake drum 182. Brake drums 182 are well known in the automotive industry, but are substantially unknown to be used in braking the movement of upward acting doors. In embodiments where a brake drum 182 is used as part of the governor assembly 102, the brake drum 182 is mounting on the shaft 114.

The brake drum 182 includes an inside surface 188 and brake shoes 186 configured to slide along the inside surface 188. The sliding causes friction which slows the rotation of the brake drum 182. The more force the brake shoes 186 contact the inside surface 188 of the brake drum 182, the more friction and braking occur. Springs 190 are used to bias the brake shoes 186 to a desired position. The faster the brake drum 182 rotates, the more the brake shoes 186 will overcome the springs 190 and urge against the inside surface 188. In this manner, the faster the brake drum 182 rotates the more braking force the brake shoes 186 will create when moved by centrifugal force against the inside surface 188. The operation of drum brakes are well known in the automotive industry and for the sake of brevity will not be described further here.

The brake drum 182 is connected to a brake washer 184 via brake washer screws 187 with optional brake screw washers 189. Axial force created by deflection of spring 132 is transmitted through sprocket bushing 130, bearing 196, thrust bearings and washers 194, the brake shoe assembly 186, and bearing 197 onto the brake washer 184. These parts are all fit and assembled so they can spin around shaft 114 and allow axial force to transmit through each other. In some embodiments, various components may be located on an unthreaded portion 198 of the shaft 114 as shown in the FIGS.

In embodiments where a brake drum 182 is used, a sprocket 192 is used and mounted to the brake shoe assembly 186 then mounted on the shaft 114. The sprocket 192 may be part of the purchased centrifugal governor from Noram (North American Clutch Corporation) or other manufacturer as shown in FIGS. 17 and 18 rather than the sprocket/bushing/plate/brake assembly 124 described in other embodiments.

Some embodiments in accordance with the present disclosure are used when door drop speeds are desired to be in the range of 6 to 24 inches per second. Some embodiments of the disclosure may be used when it is desired to have a low braking force when the door 12 is in a fully opened position and then increase the braking force on the door 12 as it moves to a down or closed position in order avoid the door 12 having difficulty opening at first and then dropping faster once the door 12 has partly moved to the open or down position. This may be due to the fact when the door 12 is in a horizontal position or wound up in a spiral, there is very little gravity force to cause the door 12 to unwind or move along the curved track area to move to the closed or down position. However, once a portion of the door 12 has moved from the spiral or curved part of the track to a vertical position, the weight of that portion of the door 12 will cause the rest of the door 12 to unwind or move along the door tracks toward the closed or down position. In some embodiments where the door 12 is a segmented door 12, often once the first segment that is moved to the vertical position there is sufficient gravitational force pulling the door 12 to the down or closed position that braking is needed to cause the door 12 to move at a desired speed.

The nut 142 can be adjusted to engage with brake plate 120 with the brake pad 122 to cause braking once a portion of the door 12 has transitioned to a vertical position. To adjust the nut 142 an operator may move the mounting structure 156 (thereby compressing the springs 152) toward the mounting plate 108. Once the mounting structure 156 is moved from an engaged position where the nut 142 in in contact with the flat surfaces 146 to a disengaged position where the nut 142 when turned does not engage the flat surfaces, the nut 142 can be rotated to move axially along the shaft 114 to a desired position. The desired position may be one that will start to compress the spring 140 only when the door 12 is in a position where braking in desired. As stated above, in some embodiments it may be desirable to start braking the door 12 about at a door position where a portion of the door 12 has begun to come out of a spiral (in the case of spiral doors) or when a first segment has moved to a vertical position (in the case of a segmented door).

As shown in FIG. 9, in some embodiments the door position will be inputted into the shaft 114 by the door shaft sprocket 168 which is connected to the door shaft 68 communicated via the chain 166 and sprocket for the door shaft 162 the door shaft 68 position (and therefore the door position). In some embodiments where the brake plate 120 is engaged with the brake pad 122 the speed of the door 12 descending may be limited to about 12.8 inches per second. Other embodiments may brake the door 12 to other speeds which may be faster or slower then 12.8 inches per second.

In some embodiments the slowest door drop speed is with the brake drum 182 held mostly fixed. Adjusting the spring 132 pressure high enough may hold the drum 182 from moving. The low end of the drop speed may depend completely upon the brake pad 122 and brake drum 182 interaction. The brake drum 182 may rotate a little as the brake pad 122 and brake drum 182 acts as a torque limiter. At faster speeds the centrifugal brake drum 182 acts as a clutch and the brake drum 182 spins against the brake pad 122.

If the brake drum 182 rotational speed drops below a threshold amount, then there will be little or no braking from the brake drum 182/brake shoe 186 interaction. For example, in some embodiments if the brake drum 182 speed drops below about 275 revolutions per minute (RPM) then there will be little or no braking from the brake drum 182/brake shoe 186 interaction. In other embodiments, other threshold speeds may be utilized. The door 12 may drop from any intermediate position as long as it is out of balance enough to overcome resistance in the differential gear mechanism and any drag from the door 12.

As mentioned above, embodiments that incorporate a brake drum 182 may provide additional braking that may vary depending upon the speed the governor shaft 70 spins. Optionally, the adjustable governor assembly 102 can be timed with the door shaft 68 so that the brake force can be applied relative to the door 12 position. The lead nut 142 can be adjusted to engage braking at any desired door 12 position. Thus, various embodiments are adjustable to vary or adjust an amount of braking due to the position of the door and/or the speed of the door. If there is no deflection of spring 132 then the door will not be slowed down because the brake drum 182 will spin freely. If the deflection of spring 132 is high enough then the brake drum 182 will not spin and the braking will be dependent upon the centrifugal braking force described previously. If spring 132 deflection is somewhere in between, then the centrifugal brake will act as a clutch and the braking force is dependent upon the friction between brake pad 122 and brake washer 184. A common sequence for this would be that there will be little or no braking when the door is at the top (drum 182 spins freely with no resistance from brake pad 122) then after the door begins to fall spring 132 is compressed some to create friction between the brake washer 184 and the brake pad 122 (drum 182 spins with torsional resistance) and then finally near the bottom enough friction exists between brake washer 184 and brake pad 122 that the brake drum 182 does not spin (braking dependent upon centrifugal brake force). This sequence tends to cause a deceleration of the door drop speed. The deceleration and drop speed are adjusted by moving nut 142. Alternately chain 166 can be disconnected to set a fixed spring 132 deflection. This fixed condition is often adequate which simplifies the assembly lowering the cost.

Other embodiments may use an adjustable governor assembly 102 of a different layout. The claims below describe what is claimed, so it should be understood that alternative layouts then what is described herein may still fall within the claims. Some embodiments may have similar parts as described above, but they may be arranged in a different configuration. For example, various parts may be located on different shafts and connected by sprockets or other suitable means. Further, the lead screw nut seat 114 have various configurations. In some embodiments it may only have a single flat surface 146 rather than the multiple ones shown. Further, the lead screw nut seat 144 may pivot or otherwise move in and out of position to selectively engage the adjustment piece 142

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. An adjustable door braking system comprising:

a shaft;

a brake pad configured to be mounted to the shaft;

a plate configured to be mounted on the shaft adjacent to the brake pad;

a spring configured to be coiled around the shaft to urge the plate toward the brake pad;

a threaded adjustment piece dimensioned and sized to be threaded on the shaft on a first side of the plate and configured to adjust an amount of force with which the spring urges the plate against the brake pad disposed on a second side of the plate as the shaft rotates with respect to the adjustment piece; and a stationary seat configured to allow the adjustment piece to move axially along the shaft and to prevent the adjustment piece from rotating with the shaft.

2. The adjustable door braking system of claim 1, further comprising:

a sprocket and chain assembly mounted on the shaft for connecting the shaft to a door assembly for braking the door assembly.

3. The adjustable door braking system of claim 2, further comprising:

a second sprocket and chain assembly mounted to the shaft for connecting the shaft to a second shaft.

4. The adjustable door braking system of claim 3, further comprising:

a door release mechanism configured to operatively connect to the second shaft.

5. The adjustable door braking system of claim 1, further comprising:

a limiter for limiting the amount of force with which the spring urges the plate against the brake pad.

6. An adjustable door braking system comprising:

a shaft;

a brake pad configured to be mounted to the shaft;

a plate configured to be mounted on the shaft adjacent to the brake pad;

a spring configured to be coiled around the shaft to urge the plate toward the brake pad;

a threaded adjustment piece dimensioned and sized to be threaded on the shaft on a first side of the plate and configured to adjust an amount of force with which the spring urges the plate against the brake pad disposed on a second side of the plate as the shaft rotates with respect to the adjustment piece;

a limiter for limiting the amount of force with which the spring urges the plate against the brake pad; and a second spring configured to urge the limiter against a bracket.

7. The adjustable door braking system of claim 1, further comprising:

a governor mounted on the shaft, wherein the governor is configured to selectively rotate with respect to the shaft, remain stationary, and transition between remaining stationary and rotating depending upon a position of a door assembly.

8. The adjustable door braking system of claim 1, further comprising:

a governor mounted on the shaft.

9. The adjustable door braking system of claim 8, wherein the governor comprises a brake drum.

10. A method of applying a variable amount of braking force to a door based upon a speed of the door or a position of the door, the method comprising:

attaching a brake plate and a brake pad disposed on a first side of the brake plate to a shaft;

configuring a spring coiled around the shaft to urge the brake plate against the brake pad;

threading an adjustment piece to the shaft on a second side of the brake plate; and configuring a stationary seat to allow the adjustment piece to move axially on the shaft as the shaft rotates with respect to the adjustment piece and prevent the adjustment piece from rotating with the shaft to thereby vary a force with which the spring urges against the brake plate.

11. The method of claim 10, further comprising:

limiting the amount of force with which the spring urges against the brake plate when the adjustment piece moves axially on the shaft.

12. The method of claim 10, further comprising:

operatively connecting a brake drum to the shaft and configuring brake shoes in the brake drum to increase braking force as a rotational speed of the brake drum increases.

13. The method of claim 10, further comprising:

operatively connecting the shaft to a door release mechanism.

* * * * *